(12) United States Patent
Gouttas et al.

(10) Patent No.: US 8,090,696 B2
(45) Date of Patent: Jan. 3, 2012

(54) METHOD AND SYSTEM FOR ASSIGNING SCORES TO ELEMENTS IN A SET OF STRUCTURED DATA

(75) Inventors: Catherine Gouttas, Paris (FR); Hamid Benhadda, Rueil-Malmaison (FR)

(73) Assignee: Thales (FR)

( * ) Notice: Subject to any disclaimer, the term of this patent is extended or adjusted under 35 U.S.C. 154(b) by 212 days.

(21) Appl. No.: 12/406,237

(22) Filed: Mar. 18, 2009

(65) Prior Publication Data

US 2009/0319514 A1    Dec. 24, 2009

(30) Foreign Application Priority Data

Mar. 26, 2008  (FR) ...................... 08 01661

(51) Int. Cl.
    *G06F 17/30*    (2006.01)
(52) U.S. Cl. ....................... 707/694; 707/758
(58) Field of Classification Search ................. 707/694, 707/758
See application file for complete search history.

(56) References Cited

U.S. PATENT DOCUMENTS

| 7,249,312 | B2 | 7/2007 | Jasper et al. |
| 2006/0143025 | A1 | 6/2006 | Jeffery et al. |
| 2006/0155514 | A1 | 7/2006 | Drouart et al. |
| 2006/0294376 | A1* | 12/2006 | Sands et al. ................... 713/168 |
| 2007/0174237 | A1* | 7/2007 | Wilbrink et al. ................. 707/3 |
| 2007/0198746 | A1* | 8/2007 | Myllyla et al. ................ 709/248 |
| 2007/0260597 | A1* | 11/2007 | Cramer ............................ 707/5 |
| 2008/0010252 | A1* | 1/2008 | Zamir et al. ..................... 707/3 |
| 2009/0136910 | A1* | 5/2009 | Mayost et al. ................ 434/350 |

FOREIGN PATENT DOCUMENTS

EP    1672444 A    6/2006

* cited by examiner

*Primary Examiner* — Son T Hoang
(74) *Attorney, Agent, or Firm* — Stroock & Stroock & Lavan LLP

(57) ABSTRACT

A system for implementing a scoring method, wherein the system includes at least a data analyzer configured to: determine a plurality of scoring intervals dependent upon the data to be analyzed; assign an integer score and a decimal score within the scoring intervals to each data to be analyzed, the score dependent upon a frequency of appearance; search a database for pairings of (scored element, decimal score); and generate an alert if the pairing is found in the database.

4 Claims, 3 Drawing Sheets

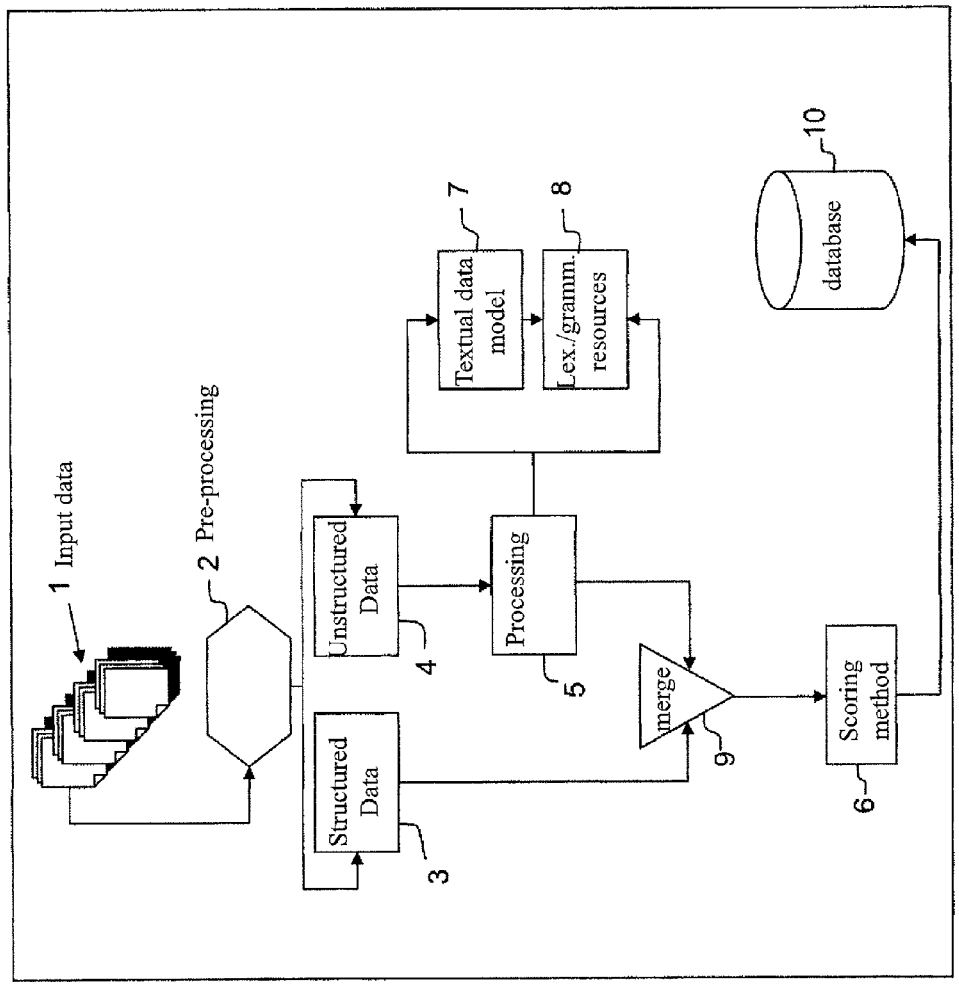
FIG.1
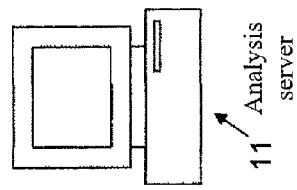

METHOD AND SYSTEM FOR ASSIGNING SCORES TO ELEMENTS IN A SET OF STRUCTURED DATA

CROSS-REFERENCE TO RELATED APPLICATION

The present application claims the benefit of French Patent Application Serial No. 0801661, filed Mar. 26, 2008, which is hereby incorporated by reference in its entirety.

FIELD OF THE INVENTION

The invention relates to a method and a system for assigning a score to an element in a set of structured data originating from structured data and/or unstructured data (texts, images, speeches, etc.), the unstructured data being converted during the pre-processing step via an automatic structured data analysis process. From this score, it is possible, in an operational system, to trigger an alert or generate other control actions resulting from the analysis obtained by the inventive method.

Hereinafter in the description, the term "structure" designates a set of data that can be put in the form of a relational table, represented, for example, by a rectangular matrix R of dimensions N×M, where N and M respectively represent the number of rows and the number of columns in the matrix R.

The invention notably applies to the field of the automatic analysis of parameters for the analysis of unstructured information when the volumes of information involved are large and cannot be analysed manually.

It can be implemented for web pages, emails, documents produced by word processing, multimedia files, video files, text files, etc. From the technical point of view, the invention provides a response to the problems of synthesizing heterogeneous information and to the problems of managing unstructured information.

BACKGROUND OF THE INVENTION

Unstructured information these days represents the majority of the data collected and used in the professional world. It plays an important role in the conduct of the professional processes but the fact that the unstructured information is not immediately available and usable in the context of the processes constitutes a major handicap.

The coding of the unstructured information and the model used in this coding (dimensions or parameters) allows for storage in a database management system or DBMS and thus renders the unstructured information available and usable by the professional processes (decision-making processes/operational processes).

In many fields, companies have to generate, store and manage large quantities of information in electronic form. Access to this information and understanding the latter can play an important role in decision-making at all levels of the company (marketing strategy, commercial strategy, quality control, control of the customer relationship, etc.). This information, in most cases, is in an unstructured form which does not allow its content to be analysed easily. Given the large volume of this information, most of the people involved use automatic text analysis techniques.

Various methods are known from the prior art for resolving the technical problems that appear in the automatic text analysis field. This automatic analysis relates, for example, to an analysis of the sentiments and of the opinions, to an analysis of risks, etc. Thus, there is the multi-mode merging technique.

Indeed, companies now need methodologies with which to automatically synthesize information of different types: texts and structured data, speeches and structured data, texts and speeches, etc.

As an example, in the field of customer relationship management, known by the abbreviation "CRM", companies need to correlate the information to the needs and the expectations of the customers (obtained from telephone calls, from customer correspondence, from messages or customer emails, surveys, forums, etc.) and the information obtained from the analysis of the behavioural and demographic data. This "bringing in relation" demands the integration and the synthesis of unstructured heterogeneous data such as speech data, textual data on the one hand and structured data on the other hand.

Also known are heterogeneous information processing methods. The issue of the heterogeneity of the data to be processed is linked not only to the multi-modality but also to the intrinsic heterogeneity of each type of data. As an example: if the interest is focused on the textual data obtained from writing from which information of feeling and opinion type is likely to be extracted, the user is faced with free texts—summaries of correspondence, electronic messages, or verbatim customer records of telephone calls, open responses to opinion surveys—which includes highly heterogeneous data, in terms of source, nature and quality, when it comes to structured data, and in terms of source, nature or genre, quality, language register and idiom when it comes to unstructured data.

When faced with an automatic analysis perspective, the inclusion of this structural heterogeneity is a methodological imperative that guarantees the effectiveness and the quality of the results that will be obtained, at the end of the analysis, whether the latter is conducted for decision-making and/or operational purposes. There are also speech modelling methods. The job of extracting sentiments and opinions from streams of text or transcribed speeches requires speech to be modelled.

U.S. Pat. No. 7,249,312 discloses a method and a system for giving a score to unstructured data. The author of this patent uses a maximum probability method to assign a score to parts of a document of a stream, and then aggregates the scores obtained to assign a final score to the document or to the data stream.

One aim of the present invention is to offer a method and a system that makes it possible notably to process large volumes of data.

The invention relies notably on the use of coding via a "scoring" process, that is, a process of assigning a score to an element or a set of elements, without learning unstructured information as structured information, in the normal operation of the method. It also uses steps for modelling and extracting unstructured information, in order to analyse the content of the texts, extract therefrom relevant information given the target applications and represent them in structured form.

SUMMARY OF THE INVENTION

An embodiment of the present invention concerns a method for assigning a score to a selected element in a database having N elements $D_i$ wherein it includes at least the following steps:
let EG be a number of parameters $O_u$ retained for analysing said database, and B−1 be the maximum frequency of appearance associated with a parameter, subdivide the interval [0, 1] into EG equal intervals $I_k^r$ of width 1/EG
define for $1 \leq k \leq EG$ intervals $$I_k^r = \left[\frac{(k-1)}{EG}, \frac{k}{EG}\right[$$

defined as follows: to each interval $I_k^r$ for $1 \leq k \leq (EG-1)$, associate an interval with integer values $I_k^e$ such as: $I_k^e = \lfloor B^{(k-1)}, B^k \rfloor$
each element $D_i$ of the database being represented by the dimension vector EG, such that:

$$\vec{D}_i = (\alpha_1, \alpha_2, \ldots, \alpha_{EG})$$

where $\alpha_u$ is the frequency of the parameter $O_u$ in the element $D_i$, with $0 \leq \alpha_u \leq (B-1)$, the method executes the following steps
determining the decimal value $V_i$ of the overall score for the element $D_i$ by using the formula:

$$V_i = \sum_{k=1}^{EG} \alpha_k \times B^{(k-1)}$$

said value $V_i^G$ belongs to one of the intervals with integer limits $I_k^e = [m_e, M_e[$ corresponding to an interval with decimal values $I_k^r = [m_d, M_d[$, then determining the overall score $N_i$ included in the interval [0, 1] for the element $D_i$ concerned in the database by using the relation:

$$N_i = m_d + \frac{V_i - m_e}{EG \times (M_e - m_e)}$$

$m_e$ and $M_e$ are the limits of the interval with integer values and $m_d$, $M_d$ the limits of the interval with decimal values, then said method executes a step during which a business process executed on a client station will search for the information in a database storing the pairings (element, score) and, according to the value of the pairing (element, score), generates an alert.

According to an embodiment, since the elements of the database take the form of data that is not structured as structured data, the method executes a step for converting unstructured data into structured data.

For the last interval, $I_{EG}^r$ is associated with the interval with integer values $I_{EG}^e = \lfloor B^{(EG-1)}, (B^{EG}-1) \rfloor$ Method uses, for example, as database an information database comprising several textual documents.

An embodiment of the invention concerns also a system for implementing the method according to previous claim of method, wherein it includes at least the following elements: means of detecting the elements contained in a database to be analysed, means of analysing said elements by executing the steps of the method according to previous claims of method, means of storing elements to which a score is assigned, and their associated score and one or more client stations executing operational and/or decision-making processes, and in that said processes will search for the information in said storage means in order to check the pairings (elements, score) and, according to the value of the score, trigger or not trigger an alert.

The elements of the database are unstructured data and system includes a module for formatting said data.

BRIEF DESCRIPTION OF THE DRAWINGS

Other features and benefits of the device according to the invention will become better apparent from reading the description that follows of an exemplary and by no means limiting embodiment given by way of illustration, with appended figures which represent:
FIG. 1, an exemplary implementation of the method according to the invention,
FIG. 2, a system architecture implementing the method,
FIG. 3, an example of CRM modelling and FIG. 4, a detail of FIG. 3.

DETAILED DESCRIPTION OF THE PREFERRED EMBODIMENT

Figure 2:
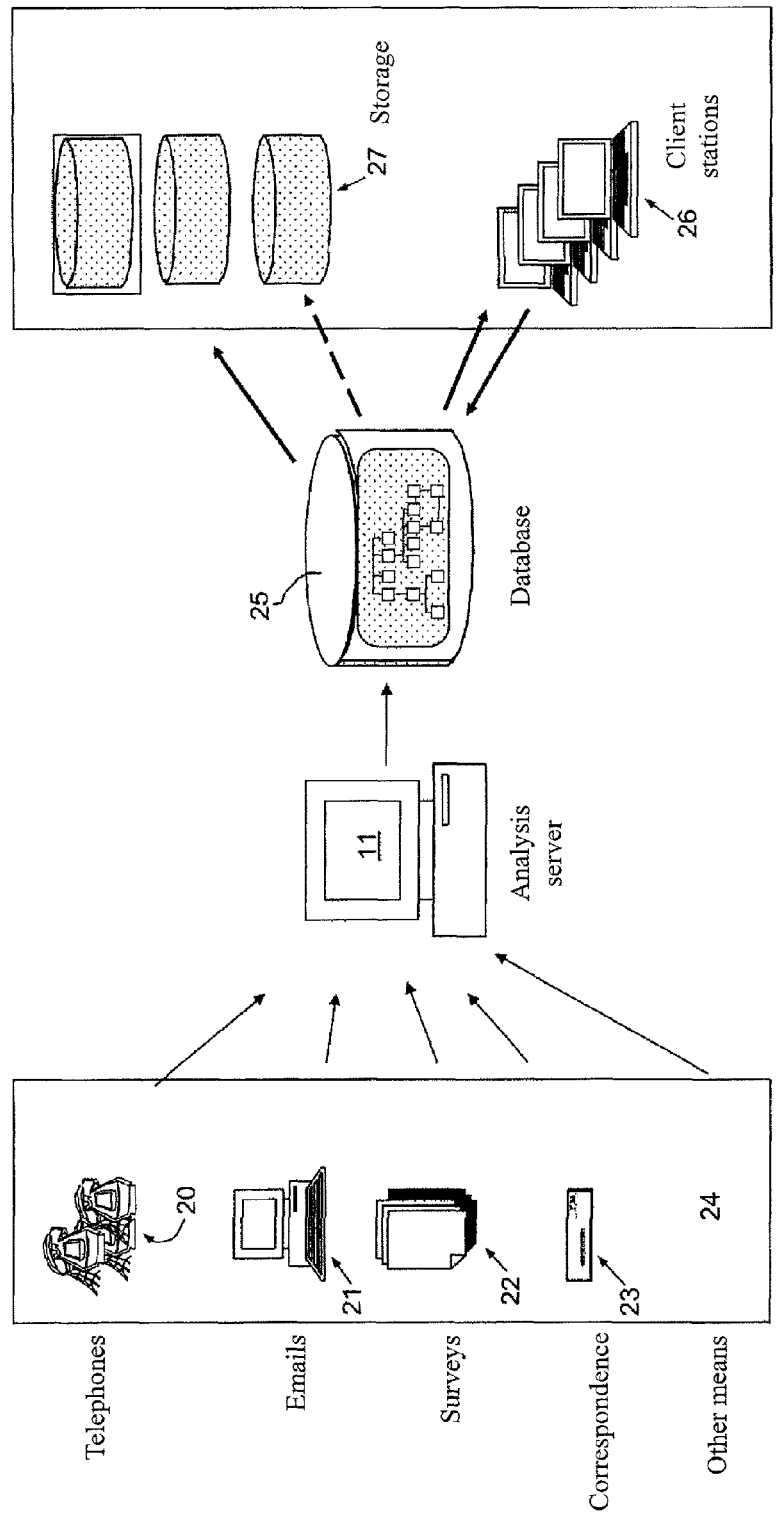

In order to better understand the principles implemented in the method according to an embodiment of the invention, the following example is given in the case of a linguistic analysis for which the desired aim is notably to:
code unstructured information as structured information, when the latter is not in a format that can be directly used by the "scoring" method according to an embodiment of the invention,
calculate a positioning indicator in the opinion sense which will be associated with a client,
synthesize the data—structured data and unstructured data, by correlating this indicator with the structured information associated with the unstructured data analysed, for example, from demographic data and behavioural data. For example, in the banking context, a complaint addressed to the bank will be addressed via the name or the identifier of the client that can be associated with the client data in the IS (demographic data and behavioural data). After processing by the method, the client complaint will be represented by a set of structured data, the data arising from opinion or feeling will be scored, that is, a score will be assigned to the data. This score will be associated with the demographic data and the behavioural data, which will enrich the knowledge and the understanding of the behaviour of the client. Given an application of the client-base segmentation type, still in the banking world, the analysis of such profiles will make it possible to identify client segments that share demographic data, behavioural data and opinion data.

FIG. 1 is a schematic representation of a flow diagram of the steps for implementing the method according to an embodiment of the invention.

The input data 1, which can include structured data and unstructured data, is first of all subjected to a pre-processing 2, notably in order to differentiate the information from structured data 3 from that from unstructured data 4. The unstructured data 4 will be the subject of a processing operation 5, 7 and 8 which will make it possible to obtain data having a structured format so that the "scoring" method 6 can be applied according to the inventive method detailed hereinbelow. For this, the processing method uses a model of textual data 7 and lexical and grammatical resources 8 known to those skilled in the art.

The data that is initially structured or structured after implementing the processing operation is then merged 9 according to a method known to those skilled in the art before being analysed by executing the steps of the "scoring" method according to an embodiment of the invention. The data to which the method has assigned a "score" is then memorized and stored in a database 10.

FIG. 2 diagrammatically represents an exemplary system according to an embodiment of the invention comprising a part 30 comprising different information sensors, such as telephone platforms 20, messages obtained from emails 21, surveys 22, correspondence 23 or any other means 24 making it possible to obtain and pick up information. The various elements or information items are transmitted to the analysis server 11 comprising the various models described in FIG. 1. The data processed and obtained from the analysis server is transmitted to a data storage base 25. This data is then transmitted to decision-making processes and/or to operational processes executed on client stations 26. The business processes will search in the database 25 for the information they need in order to be executed. Examples of business processes are given hereinbelow.

For business processes, it is possible to implement decision-making processes. This corresponds to techniques known under the English term "profiling", used to target clients according to their personal data and their opinions on such and such a product or service, or their expectations, client-based segmentation techniques that take account of both signaletic and behavioural data describing the clients and the opinions that they have expressed on such and such a product or service, etc. can be used.

As another business process, it is also possible to use operation processes. For example, in the context of "CRM" processes or in the context of a quality process, automatically and systematically directing or routing all the incoming mail associated with a given dissatisfaction score to a service that will process them as a priority, in the context of a crisis management process, triggering alerts when the event severity score or when the citizen dissatisfaction score reaches a given threshold.

Implementing the "Scoring" Method

The scoring method according to an embodiment of the invention notably includes, in the by no means limiting example explained by way of illustration, in giving scores of sentiments and/or opinions expressed in a given document. A first step therefore includes determining which are the data or parameters to which a score should be assigned. These parameters can be represented in the form of words or portions of sentences in a document, but could also, without departing from the framework of the invention, relate to parameters obtained from measuring sensors in an industrial application. Indeed, it would be possible to consider a set of parameters such as temperature, pressure, etc., for which a user wants to obtain their weight and their influence on the running of a process.

Once the parameters have been determined, the steps of the scoring method proceed as described hereinbelow.

EG is used to denote the number of parameters retained for analysing a document, or an industrial phenomenon, the parameters possibly being the various levels of dissatisfaction or satisfaction arranged in ascending order, for example, having been cited by the various elements or documents in the database to be analysed. If, for example, the database has contained five levels of dissatisfaction or satisfaction, O1, O2, O3, O4, O5, expressed by the people having written the document: for example:

O1: very displeased
O2: displeased
O3: pleased
O4: very pleased
O5: very very pleased Then there are 5 opinion parameters $O_u$ with (u=1, 2, 3, 4, 5).

(B−1) is used to denote the maximum frequency of appearance of one of the parameters, to be taken into account in the calculations.

The method subdivides the interval [0, 1] into EG equal intervals $I_k^r$ of width 1/EG, which leads to defining the intervals $$I_k^r = \left[\frac{(k-1)}{EG}, \frac{k}{EG}\right[$$

each interval $I_k^r$ for $1 \leq k \leq (EG-1)$ has associated with it an interval with integer values $I_k^e$ such that: $I_k^e = \lfloor B^{(k-1)}, B^k \lfloor$
for the last interval $I_{EG}^r$, the interval with integer values $I_{EG}^e = \lfloor B^{(EG-1)}, (B^{EG}-1) \lfloor$ is associated.

As an example, if the number of severity levels is equal to 5, i.e. (EG=5), and if the maximum frequency that can be taken into account is 9, i.e. (B=10), there will be, at this stage, the following mapping between the intervals:

| Mapping between intervals | |
|---|---|
| Interval $I_k^r$ | Interval $I_k^e$ |
| $I_1^r = \left[0, \frac{1}{5}\right[$ | $I_1^r = [1, 10[$ |
| $I_2^r = \left[\frac{1}{5}, \frac{2}{5}\right[$ | $I_2^r = [10, 100[$ |
| $I_3^r = \left[\frac{2}{5}, \frac{3}{5}\right[$ | $I_3^r = [100, 1000[$ |
| $I_4^r = \left[\frac{3}{5}, \frac{4}{5}\right[$ | $I_4^r = [1000, 10000[$ |
| $I_5^r = \left[\frac{4}{5}, 1\right]$ | $I_5^r = [10000, 99999[$ | by representing a document to be analysed by the dimension vector EG such that:

$$\vec{D}_i = (\alpha_1, \alpha_2, \ldots, \alpha_{EG})$$

where $\alpha_u$ is the frequency of appearance of the parameter $O_u$ in the element of the database of the document $D_i$ (or the number of times where the opinion level has been cited in the document), with $0 \leq \alpha_u \leq (B-1)$, the method then begins by: determining the decimal value $V_i$ of the overall score for this element of the database or this document by using the formula:

$$V_i = \sum_{u=1}^{EG} \alpha_u \times B^{(u-1)}$$

this value $V_i$ will belong to one of the intervals with integer limits $I_k^e = [m_e, M_e[$ corresponding to an interval with decimal values $I_k^r = [m_d, M_d[$ the method will then determine the overall score $N_i$ for the element or the document concerned in the database to be analysed by using the relation:

$$N_i = m_d + \frac{V_i - m_e}{EG \times (M_e - m_e)}$$

The parameter concerned in the document is, for example, the severity parameter.

In order to help the reader's understanding, an example is given.

Assume the following table with $D_i$ being the document i in the database, $O_u$ being the parameter that can appear in an element of the database:

|     | O1 | O2 | O3 | O4 | O5 |
| --- | --- | --- | --- | --- | --- |
| D1  | 1  | 0  | 0  | 0  | 1  |
| D2  | 9  | 9  | 0  | 0  | 0  |
| D3  | 0  | 0  | 6  | 8  | 0  |
| D4  | 0  | 5  | 5  | 0  | 0  |
| D5  | 9  | 9  | 4  | 0  | 0  |
| D6  | 0  | 0  | 1  | 1  | 3  | the maximum frequency being 9, (B=10), (EG=5) (5 opinion levels) and N=6 (number of documents in the database).

The integer value (integer value score) for the document D1 is:

$$V_1 = \sum_{k=1}^{5} \alpha_k \times 10^{(k-1)} = 1 + 0 + 0 + 0 + 10^4 = 10001,$$

this value belongs to the interval $I_5{}^r=[10000,99999]$, the corresponding decimal value $N_i$ will therefore belong to the interval $I_5{}^r=[4/5,1]$. In practice, $$N_i = \frac{4}{5} + \frac{1001 - 10000}{5 \times (99999 - 10000)} = 0.8$$

The integer value (integer value score) for the document D3 is:

$$V_1 = \sum_{k=1}^{5} \alpha_k \times 10^{(k-1)} = 0 + 0 + 6 \times 10^2 + 8 \times 10^3 + 0 = 8600,$$

this value belongs to the interval $I_4{}^r=[1000,10000[$, the corresponding decimal value $N_i$ will therefore belong to the interval $I_4{}^r=[3/5,4/5[$. Indeed, $$N_i = \frac{3}{5} + \frac{8600 - 1000}{5 \times (10000 - 1000)} = 0.77$$

Modelling the Data, (Formatting Unstructured Data as Structured Data).

The method executes a pre-processing step for the initial data in order to put it into a structured data format. This pre-processing step is based on linguistic processing operations, dependent on the modelling of the data.

The modelling principle used makes it possible notably to take into account the profession, the nature of the data and the analysis needs for a given application. It is similar to the database models and gives a rough operational value.

Figure 3:
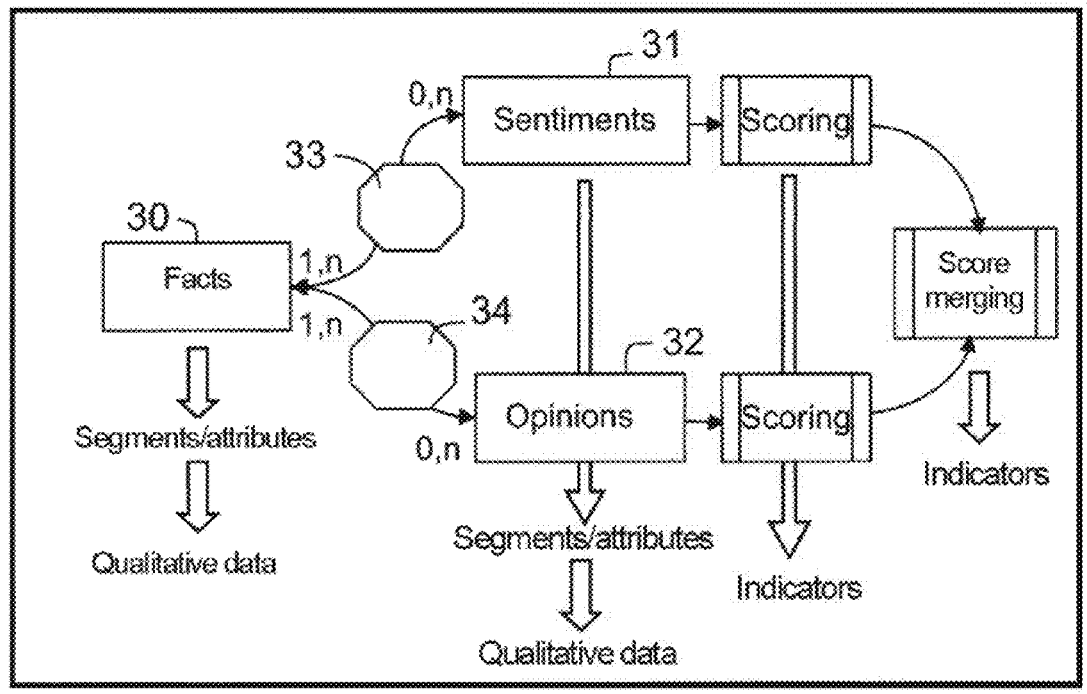

FIG. 3 diagrammatically represents different steps executed to model a speech. Regardless of the area concerned and the nature of the data to be processed, the method relies on a modelling in dimension or parameter form of the content of the unstructured information being analysed. This choice in terms of modelling makes it possible to define a "Model" component, the structure of which produces results that can be directly integrated into a database management system.

FIG. 3 represents an analysis model defined for the area of customer relationship management, or CRM, or understanding the customer. This model makes it possible notably to analyse the customer/company interaction of types including telephone calls, electronic messages, complaint correspondence, satisfaction surveys with open questions.

The parameters retained to illustrate the method according to an embodiment of the invention are, for example, as follows:

the dimension of the facts or (FACTS) 30 which makes it possible to identify the statement of the problem encountered, the dimension of the sentiments (SENTIMENTS) 31 which makes it possible to identify the particular point of view of the enunciator based on the affective values, the dimension of the opinions (/OPINIONS) 32 makes it possible to identify the particular point of view of the enunciator based on the intellectual values.

According to the degree of analysis expected and the application requirement, this four-dimensional structure can be enriched with new dimensions, such as the dimension of the requirement (REQUIREMENT) 33 or of the expectations 34 expressed by the customers, the dimension of the competitors (COMPETITORS), and so on.

Figure 4:
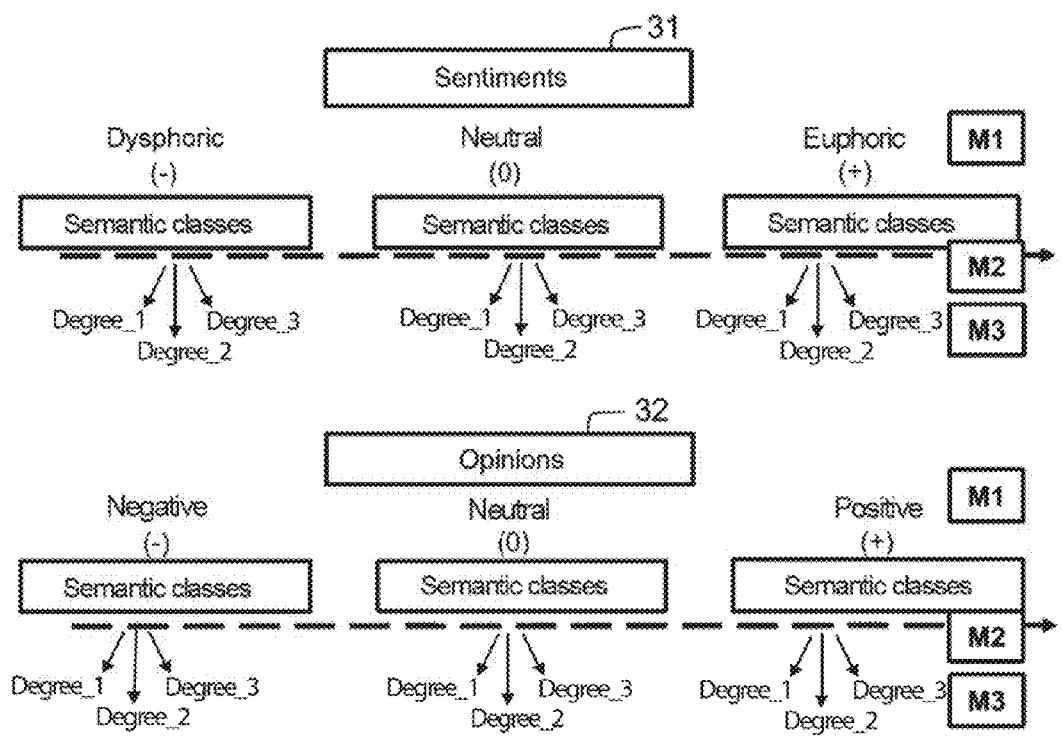

FIG. 4 points out and details certain dimensions of FIG. 3. For example, for the dimensions SENTIMENTS 31 and OPINIONS 32, it is possible to define 3 sub-dimensions which maintain between them a hierarchical dependency relationship:

The first represents the dimension of the polarities with 3 values: negative, neutral, positive.

Under the dimension of the polarities M1, there is the dimension of the semantic classes M2 which makes it possible to organize the sentiments and the opinions in classes, according to a predefined typology.

Under the dimension of the semantic classes, there is the dimension of the degrees M3 which makes it possible to sub-categorize the semantic classes in three values, according to a degree or intensity criterion.

The example relating to an extract from a complaint base is given as a non limiting example to illustrate this approach.

The unstructured input data originates from a manual transcription of telephone calls, by tele-consultants, for example: "the customer is extremely disappointed by the new statements . . . "

The model and the information extraction tools that are associated with them make it possible to annotate the text extract as follows:

"The customer is [extremely disappointed] sentiment/negative/disappointment/degree 3 . . . ."

Some complex texts can demand a degradation of the model which, as an example, can be of the type (SENTIMENTS/polarities axis/semantic classes+OPINIONS/polarities axis/semantic classes).

The system and the method according to the invention described hereinabove can be implemented and applied in numerous fields, for example: for people involved in intelligence gathering (of all types), people involved in CRM, quality control, process control and monitoring in a factory, for example, assigning a weighting to the various measured parameters. They are also useful for analysing risk in general: health risk, environmental risk, etc., crisis management, provision of information, research firms, consultancies and suppliers of products and services.

The invention claimed is:

1. A computer-implemented method for assigning a score to a selected element in a first database having n elements $D_i$, wherein i is an index variable within a range of $1 \leq i \leq n$, comprising steps of:

subdividing, by a computer processor, an interval [0,1] into a plurality of EG equal intervals $I_k^r$, each of the intervals being of width $$\frac{1}{EG},$$

wherein EG comprises a quantity of a plurality of opinion parameters $O_u$ retained for analyzing the first database, wherein u is an index variable with a range of $1 \leq u \leq EG$ and $O_u$ represents a corresponding opinion parameter at the index u;

defining, by the computer processor, the intervals $I_k^r$ in accordance with the following relationship:

$$I_k^r = \left[\frac{(k-1)}{EG}, \frac{k}{EG}\right[$$

wherein k is an index variable with a range of $1 \leq k \leq (EG-1)$;

associating, by the computer processor, each of the intervals $I_k^r$ with an integer interval $I_k^e$ comprising integer limits, wherein $I_k^e$ is determined in accordance with the following relationship:

$$I_k^e = \lfloor B^{(k-1)}, B^k \lfloor,$$

representing, by the computer processor, each of the elements $D_i$ of the first database by a vector of length EG in accordance with the following relationship:

$$\vec{D}_i = (\alpha 1, \alpha 2, \ldots, \alpha_{EG}),$$

wherein $\alpha_u$ is a frequency of appearance of the corresponding opinion parameter $O_u$ in the elements $D_i$ of the first database with $1 \leq \alpha_u \leq (B-1)$, wherein B corresponds to a maximum frequency of appearance of all of the opinion parameters $O_u$;

determining, by the computer processor, an integer value $V_i$ of an overall score for the elements $D_i$ of the first database in accordance with the following relationship:

$$V_i = \sum_{k=1}^{EG} \alpha_k \times B^{(k-1)}$$

determining, by the computer processor, an interval $I_k^e$ having integer limits $[m_e, M_e[$ corresponding to an interval $I_k^r$ having decimal limits $[m_d, M_d[$, wherein:

$V_i$ belongs to the intervals $I_k^e$ having the integer limits and $I_k^r$ having the decimal limits;

$m_e$ and $M_e$ are the integer limits of the interval $I_k^e$;

$m_d$ and $M_d$ are the decimal limits of the interval $I_k^r$; and determining, by the computer processor, a decimal value overall score $N_i$ within the interval [0,1] for the elements $D_i$ of the first database, wherein $N_i$ is determined in accordance with the following relationship:

$$N_i = m_d + \frac{V_i - m_e}{EG \times (M_e - m_e)};$$

wherein r indicates a real value, e indicates an integer value, and d indicates a decimal value;

searching, by the computer processor, a second database for a pairing of (element, decimal value overall score); and generating, by the computer processor, an alert when the pairing is found in the second database.

2. The computer-implemented method according to claim 1, wherein the elements $D_i$ of the first database comprise unstructured data, the method further comprises a step of converting unstructured data into structured data.

3. The computer-implemented method according to claim 1, wherein for a last interval, $I_{EG}^r$ is associated with an interval having integer values $I_{EG}^e = \lfloor B^{(EG-1)}, (B^{EG}-1) \lfloor$.

4. The computer-implemented method according to claim 1, wherein the first database comprises a plurality of textual documents.

* * * * *